United States Patent
Mills et al.

(10) Patent No.: US 8,014,928 B2
(45) Date of Patent: Sep. 6, 2011

(54) AUTOMOTIVE SLIPSTREAMING SUPPORT SYSTEM

(75) Inventors: Aaron L. Mills, Ann Arbor, MI (US); Anthony Gerald King, Ann Arbor, MI (US); Alex Miller, Canton, MI (US); John Curtis Hickey, Belleville, MI (US); Robert Lietz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 750 days.

(21) Appl. No.: 12/140,319

(22) Filed: Jun. 17, 2008

(65) Prior Publication Data
US 2009/0312923 A1 Dec. 17, 2009

(51) Int. Cl.
*G06F 17/00* (2006.01)
(52) U.S. Cl. .............. 701/96; 701/57; 701/300
(58) Field of Classification Search ........... 701/45, 701/57, 96, 300, 36, 213, 99, 93, 301; 340/903
See application file for complete search history.

(56) References Cited

U.S. PATENT DOCUMENTS

| | | | |
|---|---|---|---|
| 5,999,092 A | 12/1999 | Smith et al. | |
| 6,502,034 B1 | 12/2002 | Miller | |
| 6,560,525 B1 | 5/2003 | Joyce et al. | |
| 6,708,099 B2 | 3/2004 | Tellis et al. | |
| 6,882,923 B2 | 4/2005 | Miller et al. | |
| 6,968,266 B2 | 11/2005 | Ahmed-Zaid et al. | |
| 7,046,167 B2 | 5/2006 | Rao et al. | |
| 7,158,015 B2 | 1/2007 | Rao et al. | |
| 7,197,396 B2 | 3/2007 | Stopczynski | |
| 7,260,465 B2 | 8/2007 | Waldis et al. | |
| 7,321,817 B2 | 1/2008 | Prakah-Asante et al. | |
| 7,460,946 B2 * | 12/2008 | Shima ........................ 701/96 |
| 2006/0224295 A1 | 10/2006 | Tengler et al. | |
| 2006/0271266 A1 | 11/2006 | Kakuya et al. | |
| 2007/0111857 A1 | 5/2007 | De Mersseman | |

FOREIGN PATENT DOCUMENTS

| | | |
|---|---|---|
| JP | 10166894 | 6/1998 |
| JP | 2005/076772 | 3/2005 |

* cited by examiner

*Primary Examiner* — Richard M. Camby
(74) *Attorney, Agent, or Firm* — Franklin MacKenzie; Ford Global Technologies, LLC

(57) ABSTRACT

Systems and methods are provided to enhance the ability of a driver to safely slipstream a leading vehicle to realize a fuel economy benefit.

18 Claims, 4 Drawing Sheets

AUTOMOTIVE SLIPSTREAMING SUPPORT SYSTEM

TECHNICAL FIELD

This disclosure relates to systems and methods designed to enhance the ability of a driver to safely slipstream a leading vehicle to realize a fuel economy benefit.

BACKGROUND

Increases in fuel prices have led consumers to purchase vehicles having improved fuel economy. Such increases have also led consumers to drive their currently-owned vehicles in a manner designed to optimize fuel economy. Auto manufacturers, aware of these ever-increasing fuel prices, continue to design vehicles to optimize for fuel economy. Additionally, auto manufacturers continue to design systems to assist consumers in being able to drive their vehicles to optimize for fuel economy.

A practice of slipstreaming, also known as drafting, has been known to provide a benefit in fuel economy. This practice involves driving a vehicle to closely follow a leading vehicle, also known as an in-path vehicle. When a leading vehicle and a following vehicle are sufficiently close, the aerodynamics of the arrangement of vehicles reduces a coefficient of drag ($C_d$) on the leading and the following vehicle. This reduction translates into a fuel economy benefit for the leading and the following vehicle.

Presently, drivers can attempt slipstreaming manually. However, such drivers lack information regarding the optimal range of distances they should maintain from a leading vehicle to optimize for fuel economy. Such drivers lack specific information regarding the effect of an incline, the effect of wheel torque, etc., and are left to guess what distance would provide optimal fuel economy. Without guidance based upon real-world factors, drivers may take unnecessary safety risks, trailing a leading vehicle too closely.

Additionally, drivers attempting to manually slipstream a leading vehicle must rely solely upon their reflexes to safely achieve the trailing distance they guessed would be desirable for a fuel economy benefit.

It would therefore be desirable to provide a driver-support system for slipstreaming on a host vehicle to assist the driver by providing optimal distance information and by providing automated speed adjustments and gear shifting for fuel economy purposes. It would also be desirable to offer such a driver-support system in combination with a safety system such as a forward collision warning system.

SUMMARY

A system and method are provided to address, at least in part, one or more of the needs or desires left unaddressed by prior systems and methods.

A system for use in slipstreaming is provided. The system includes at least one mechanism for sensing a presence of an in-path vehicle. The system also includes at least one mechanism for sensing factors on a host vehicle relevant to an estimation of coefficient of drag. Additionally, the system includes a controller. The controller is in communication with the sensing mechanism(s) for the in-path vehicle and with the sensing mechanism(s) for the host vehicle. The controller is adapted to calculate an estimated range of distances for the host vehicle to trail the in-path vehicle to optimize for fuel economy of the host vehicle.

A method of supporting a driver's efforts for slipstreaming is provided. The method includes a step of sensing an in-path vehicle. The method also includes a step of sensing factors about a host vehicle relevant to a calculation of coefficient of drag. Additionally, the method includes a step of calculating an estimated range of distance of distances by which the host vehicle can trail the in-path vehicle to optimize for fuel economy. The method also includes a step of displaying whether an instantaneous distance provides a fuel economy benefit or detriment.

These and other embodiments will become apparent upon a reading of the application and appended claims, without departing from the scope and spirit of the invention as set forth in the claims.

DETAILED DESCRIPTION

Figure 2:
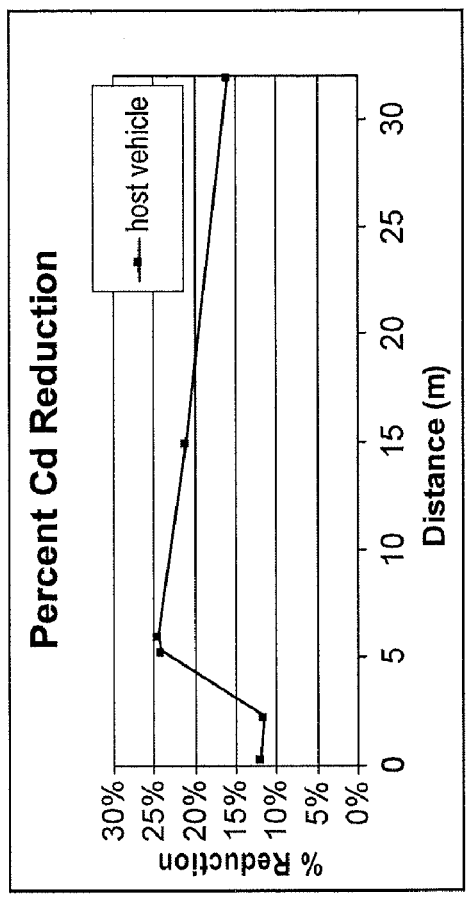
FIG. 2 is a graph plotting the percentage of reduction of a coefficient against trailing distances.
Figure 1:
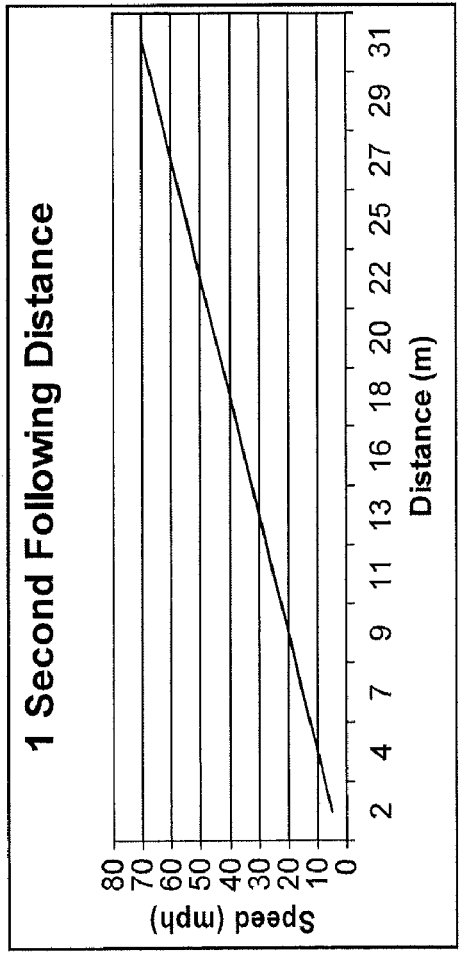
FIG. 1 is a graph plotting speed against trailing distances at a one-second following distance.
Figure 3:
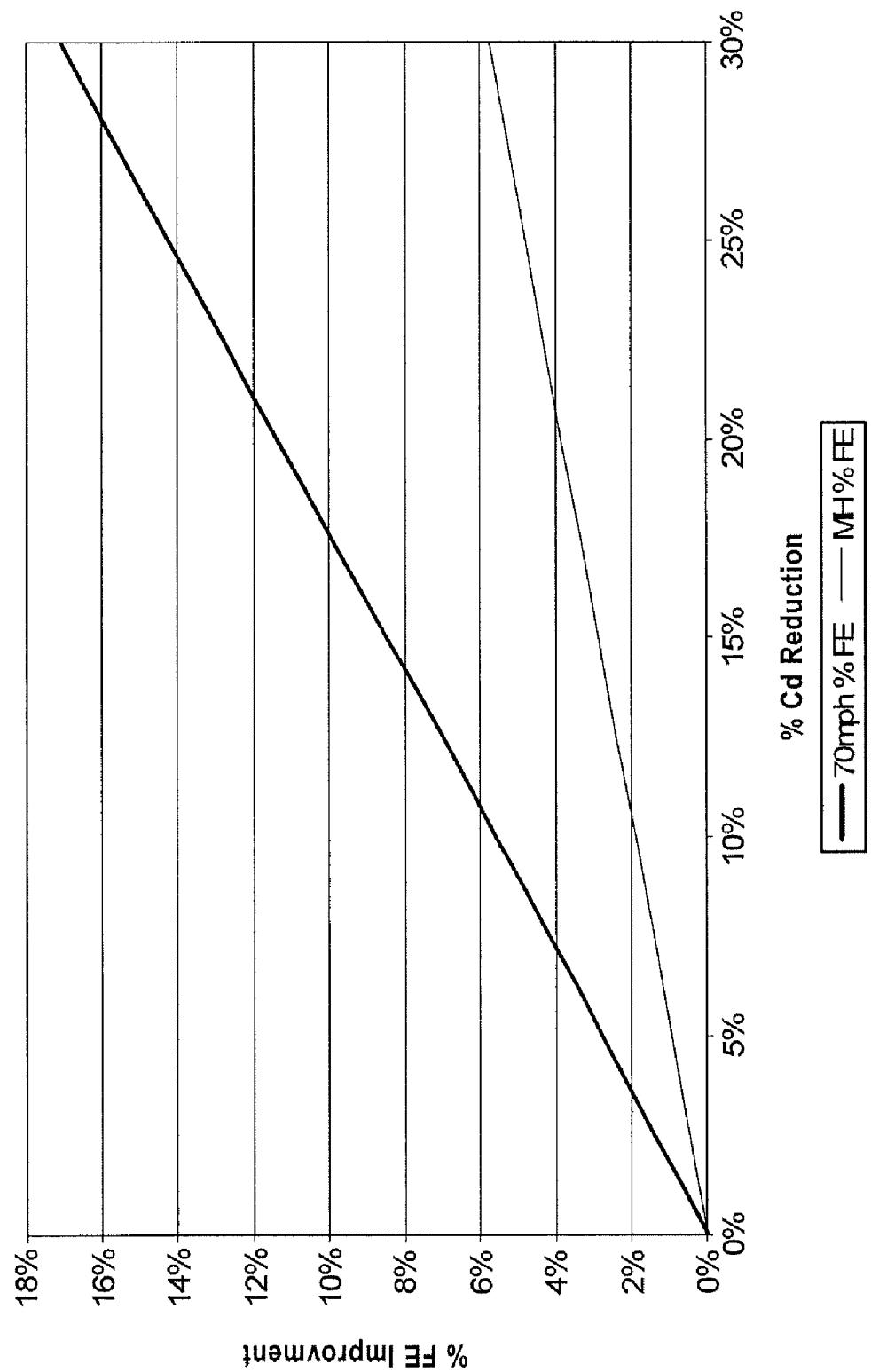
FIG. 3 is a graph relating the reduction of coefficient of drag to a percentage of improvement in fuel economy.
Figure 4:
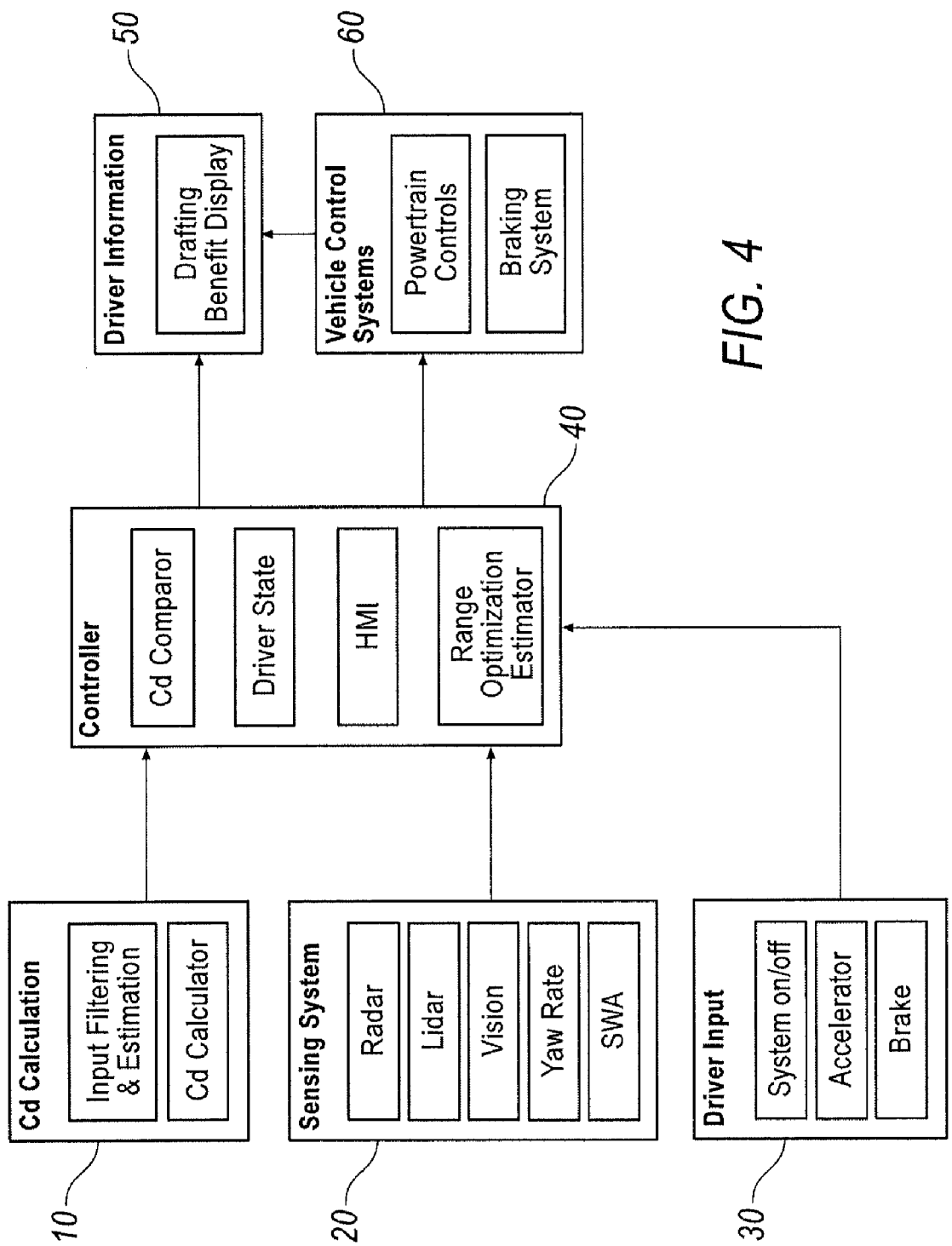
FIG. 4 is a schematic of an exemplary driver support system.
Figure 5:
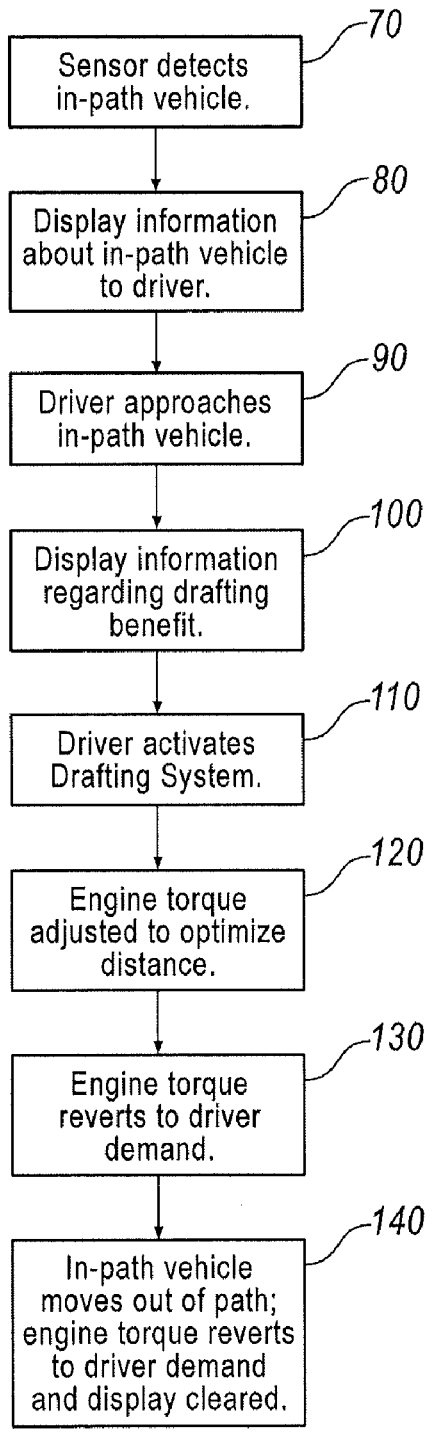
FIG. 5 is a schematic of an exemplary use of a driver support system.

References to Figures and examples herein are intended to be illustrative and non-limiting. FIGS. 1-3 demonstrate the benefit of slipstreaming on fuel economy, generally. FIGS. 4-5 provide exemplary, non-limiting schematics of driver support systems for enhanced slipstreaming.

Referring to FIG. 1, a graph is shown plotting distance against speed in instances where one vehicle follows another by one-second following distance. A one-second following distance describes the situation where a leading vehicle crosses a marker at to, and a following vehicle crosses the same marker one second later, at $t_0+1$ sec. A one-second following distance necessarily varies with speed, as depicted in FIG. 1. For example, where two vehicles are traveling at about 70 mph, a following vehicle must remain behind a leading vehicle by about 31 meters to maintain a one-second following distance.

Referring to FIG. 2, a graph shows a percentage of reduction in a coefficient of drag ($C_d$) acting on a following car as a function separation distance, also known as a trailing distance. Data points were taken when the distance between a rear bumper of a leading vehicle and a front bumper of a following vehicle was 360 mm, 2.3 m, 5.3 m, 15 m and 31 m. Coefficient of drag is affected by many variables, including trailing distance and the size and structure of the wake created by the shape of the leading vehicle. The data of FIG. 2 is representative of leading vehicles having the same or similar size and shape as following vehicles. In the example shown in FIG. 2, the percent reduction of $C_d$ peaked at about 5 m trailing distance (about 25% reduction), but a notable percent reduction of $C_d$ remained at a distance of about 31 m trailing distance (about 15% reduction).

Referring to FIG. 3, the percent reduction of $C_d$ is related to the percentage of fuel economy improvement. As depicted in FIG. 3, when the percent reduction of $C_d$ is about 15%, the percentage of fuel economy improvement is 10% at 70 mph and 3% MH drive cycles.

Referring to FIG. 4, a schematic for an exemplary system to be installed on a host vehicle is shown. A $C_d$ Calculation module 10 is shown. This module calculates an estimated $C_d$ based upon various inputs that an auto manufacturer can determine. Such inputs may include wheel torques of the wheels of the host vehicle, vehicle speed of the host vehicle, vehicle acceleration of the host vehicle, vehicle inclination, and tire pressure of the tires of the host vehicle. More or fewer variables may be selected by the auto manufacturer, depending upon the logic formula it intends to implement in its commercial application. The output of the $C_d$ Calculation module 10 is an estimated $C_d$ acting on the host vehicle that is communicated to a controller 40.

A sensing system 20 on the host vehicle also provides input to the controller 40. The sensing system 20 can provide any number of inputs to the controller 40, depending upon the specific requirements of the auto manufacturer. Among other inputs, the sensing system 20 can provide information regarding the distance of the closest in-path vehicle and the speed of the closest in-path vehicle.

To make its detections, the sensing system 20 may include one or more of a radar, a lidar, or a vision system. The sensing system 20 may also sense data regarding yaw rate, which is a vehicle's angular velocity around its vertical axis. Yaw rate can be measured with a piezoelectric sensor and/or a micromechanical sensor. The sensing system 20 may further include a sensor to measure SWA (steering wheel angle). The sensing system 20 may include more or fewer sensors depending on the nature of the overall driver support system the auto manufacture intends to implement commercially. For example, because the actual engine torque can be biased by road grades, the inclusion of a pitch rate sensor in a restraint control module (RCM) may allow the measured $C_d$ described in module 10 to be adjusted for hill ascent and/or descent.

The sensing system 20 may include sensors already in place for other systems in the host vehicle such as well-known frontal collision warning systems and adaptive cruise control (ACC) systems. Exemplary suitable ACC systems and components are identified or described in U.S. Pat. Nos. 7,260,465, 6,968,266, 6,882,923, 6,708,099, 6,560,525, and 6,502,034 owned by Ford Global Technologies, each of which is incorporated by reference in its entirety. Exemplary suitable frontal collision warning systems are identified or described in U.S. Pat. Nos. 7,321,817, 7,260,461, 7,197,396, 7,158,015, 7,046,167, and 5,999,092 owned by Ford Global Technologies, each of which is incorporated by reference in its entirety.

Other input relevant to fuel economy can be provided to the controller 40 about the host vehicle, whether such input is sensed or calculated or sent from another system in the host vehicle. Some such factors may be relevant to $C_d$ calculation, and some may not be. Fuel economy depends on several factors, including but not limited to air temperature, which gear the host vehicle is in, a state the torque converter (open, locked or modulated), a throttle open/close rate, spark advance, brake application rate, deceleration fuel shut-off, brake system current draw. An efficient speed control strategy for a host vehicle may provide fuel economy benefits that can be amplified using a driver support system for slipstreaming.

A driver input module 30 also provides input to the controller 40. The driver input module 30 permits the driver to turn the overall driver support system on and off. The auto manufacturer can adapt the on and off switch such that an "off" status permits a driver information display module 50 to display the existence of a fuel economy benefit but disables the ability of the controller 40 to communicate with any of a number of vehicle control systems 60 such as a powertrain control to alter speeds or shift gears to optimize for a fuel economy benefit, or a braking system. The specific systems identified in the vehicle control systems 60 of FIG. 4 is exemplary and not limiting—it is contemplated that other systems could be included.

Alternatively, the auto manufacturer can adapt the on and off switch such that "off" turns off the driver information display module 50 as well as disabling the ability of the controller 40 to communicate with vehicle control systems 60 to alter speeds or shift gears or brake or the like. Additionally, when the driver support system for slipstreaming is "on," the driver input module 30 permits the controller 40 and any of the vehicle control systems 60 to accommodate for the driver's interactions with the acceleration pedal and with the brake pedal to optimize for fuel economy benefit.

The controller 40 compares the estimated $C_d$ (output from the module 10) with a theoretical $C_d$ (a $C_d$ when there is no in-path vehicle) to determine whether and to what degree there is a $C_d$ reduction. There are various ways to optimize this comparison to make it more robust. For instance, one could calculate a theoretical $C_d$ and the rolling resistance coefficients ($f_o$ and $f_s$) over a long period of time when there is no leading vehicle for a better comparison. These values can be estimated based upon knowledge of the instantaneous engine torque (a parameter in an engine control module (ECM)), vehicle speed, vehicle acceleration, and optionally vehicle inclination and tire pressure. Coefficient of drag, as is well understood, is based on the velocity squared, where as $f_s$ is based upon velocity and $f_o$ is constant. The comparison will determine whether and to what degree a fuel economy benefit will occur.

The controller 40 also accommodates for driver input such as pressure on the gas pedal or pressure on the brake. The controller 40 also includes logic to manage the human-machine interface (HMI), as well as logic for the range optimization estimator (the output from which may be an optimal following speed). Such a module may optimize trailing distance against the speed of the in-path vehicle and the host vehicle. In determining a lower end of an optimal range of trailing distances, for safety purposes, the auto manufacture may elect to hard-code a distance at which the system will not recommend a closer proximity to a leading vehicle, even if the closer proximity were to have a greater fuel economy benefit. An auto manufacturer may also elect to implement a formulaic approach for safety purposes, such as not recommending a closer proximity to a leading vehicle than a one-second following distance. An auto manufacturer may also elect to disable the driver support system for slipstreaming, including any display panels, if any of the safety logic is breached by the driver; that is, the driver is too close to a leading vehicle or the driver is following a leading vehicle more closely than a one-second following distance.

The controller 40 may also be in communication with a warning system. The warning system may be activated if the driver breaches the safety logic. Logic for such a warning system may be a part of controller 40 or in any forward collision warning system, whether or not such a forward collision warning system is in communication with controller 40. A warning resulting from such logical may be announced to the driver using any mechanism, whether visual or audible or both. Alternatively or additionally, such a warning output may be coupled with a display device associated with driver information display module 50.

The controller 40 is coupled with the driver information display module 50. The driver information display module 50 can be configured in any manner to permit the display of warnings regarding collisions and/or the real-time or instantaneous slipstreaming benefit or detriment in the host vehicle.

Hardware associated with the driver information display module 50 can display the range of distances from which a benefit can be derived and the host vehicle's relative position. The display can be numeric or an abstract visual display. For Ford, Lincoln, Mercury and Volvo products, the display module 50 could include or comprise or communicate with a heads up display (HUD) for a warning light bar. The HUD is already in such vehicles as a part of their collision warning with brake support system.

The controller 40 may also be in communication with any number of vehicle control systems 60. The vehicle control systems 60 may include logic such that modifies driver input to the throttle, within limited bounds, to optimize for fuel economy when the system is "on." For example, if the driver applies more pressure to the accelerator than is necessary to fall within the optimal trailing distance range, the driver support system for slipstreaming can correct for the driver's error. To this end, the vehicle control systems 60 may directly or indirectly cause an adjustment of speed or shifting of gears using technology such as that of ACC systems, including but not limited to those described above by reference.

It is contemplated that logic other than that exemplified in FIG. 4 may be used to achieve the slipstreaming effect. For example, alternative approaches to slipstreaming may be taken other than automatically adjusting engine torque to follow a leading car within an optimized range of distances as shown in FIG. 4. For example, an ACC controller can accept input based on engine torque instantaneously measured and compare that to a base value for when a leading vehicle is in-path. Depending upon the result of the comparison, the ACC could automatically adjust a trailing distance. Using this approach, an ACC gap setting may be based upon distance rather than time, the distance being selected based upon slipstreaming effects caused by a reduction in coefficient of drag, as determined by an engine torque calculation.

Referring to FIG. 5, a use of a slipstreaming system is exemplified. In module 70, a sensor identifies an in-path or leading vehicle. In module 80, information is displayed to the driver about the in-path vehicle. In module 90, the driver approaches the in-path vehicle. In module 100, information is displayed about the drafting benefit, noting that the host vehicle is either currently receiving a fuel economy benefit or detriment from slipstreaming the in-path vehicle. In module 110, the driver activates the driver support system. In module 120, the engine torque of the driver's vehicle is automatically adjusted to optimize the trailing distance for a better fuel economy benefit. It can be programmed to modify driver input or to replace driver input. In module 130, engine torque returns to true driver demand due to the driver applying a predetermined amount of pressure on the accelerator pedal or by applying a predetermined amount of pressure on the break pedal or by turning the system off or by the system turning itself off due to a breach of a built-in safety system such as a one-second following distance. In module 140, the in-path vehicle turns or acts in some other manner to adjust its status as an in-path vehicle. In such an instance, the engine torque is returned to true driver demand and the display hardware associated with the driver information module 50 is cleared.

While at least one embodiment of the appended claims has been described in the specification, those skilled in the art recognize that the words used are words of description, and not words of limitation. Many variations and modifications are possible without departing from the scope and spirit of the invention as set forth in the appended claims.

We claim:

1. A system for use in slipstreaming, comprising:
   (a) at least one mechanism for sensing a presence of an in-path vehicle;
   (b) at least one mechanism for sensing factors on a host vehicle relevant to an estimation of coefficient of drag;
   (c) a controller in communication with the sensing mechanism(s) for the in-path vehicle and with the sensing mechanism(s) for the host vehicle, the controller adapted to calculate an estimated range of distances for the host vehicle to trail the in-path vehicle to optimize for fuel economy of the host vehicle.

2. The system of claim 1 further comprising a display unit, the controller being in communication with the display unit to display the range of distances.

3. The system of claim 1 further comprising an on/off switch and a powertrain control unit configured such than when the switch is "on", the powertrain control unit is configured to automatically adjust speed and shift gears to optimize for fuel economy.

4. The system of claim 3 wherein the powertrain control unit does not require driver input from the accelerator pedal or the brake pedal when the switch is "on."

5. The system of claim 3 wherein the powertrain control unit accounts for driver input from the accelerator pedal or the brake pedal when the switch is "on" without causing the switch to be turned "off."

6. The system of claim 3 wherein the powertrain control unit accounts for driver input from the accelerator pedal or the brake pedal when the switch is "on" by causing the switch to be turned "off."

7. The system of claim 1 wherein at least of the mechanisms for sensing in-path vehicles is selected from the group consisting of radar, lidar and vision.

8. The system of claim 1 wherein at least of the mechanisms for sensing factors relevant to coefficient of drag is selected from the group consisting of radar, lidar and vision.

9. The system of claim 1 wherein the factors relevant to coefficient of drag include wheel torque, velocity, acceleration, incline, and tire pressure.

10. A vehicle comprising the system of claim 1 and a forward collision warning system.

11. A method of supporting a driver in a host vehicle for slipstreaming, comprising:
    (a) sensing an in-path vehicle;
    (b) sensing factors about a host vehicle relevant to a calculation of coefficient of drag;
    (c) calculating an estimated distance or a range of estimated distances by which the host vehicle can trail the in-path vehicle to optimize for fuel economy; and
    (d) displaying whether an instantaneous distance results in a fuel economy benefit.

12. The method of claim 11 wherein the displaying step further comprises displaying whether an instantaneous distance results in a fuel economy detriment.

13. The method of claim 11 further comprising automatically adjusting speed of the host vehicle, in the absence of driver input, to move the host vehicle into the estimated range or to maintain the host vehicle position in the estimated range.

14. The method of claim 11 further comprising automatically shifting gears of the host vehicle, in the absence of driver input, to move the host vehicle into the estimated range or to maintain the host vehicle position in the estimated range.

15. The method of claim 11 further comprising automatically adjusting speed of the host vehicle, accounting for driver input, to move the host vehicle into the estimated range or maintain the host vehicle position in the estimated range.

16. The method of claim 11 further comprising automatically shifting gears of the host vehicle, accounting for driver input, to move the host vehicle into the estimated range or to maintain the host vehicle position in the estimated range.

17. A method of supporting a driver in a host vehicle for improving fuel economy, comprising:
（a) sensing an in-path vehicle;
(b) receiving input about the host vehicle relevant to fuel economy;
(c) calculating a distance or range of distances by which the host vehicle can trail the in-path vehicle to optimize for fuel economy; and
(d) displaying whether an instantaneous distance results in a fuel economy benefit.

18. The method of claim 17 wherein the factors relevant to fuel economy are one or more of speed, distance from the in-path vehicle, coefficient of drag, torque converter state, throttle open/close rate, spark advance, brake application rate, braking system current draw and deceleration fuel shut-off.

* * * * *